UNITED STATES PATENT OFFICE.

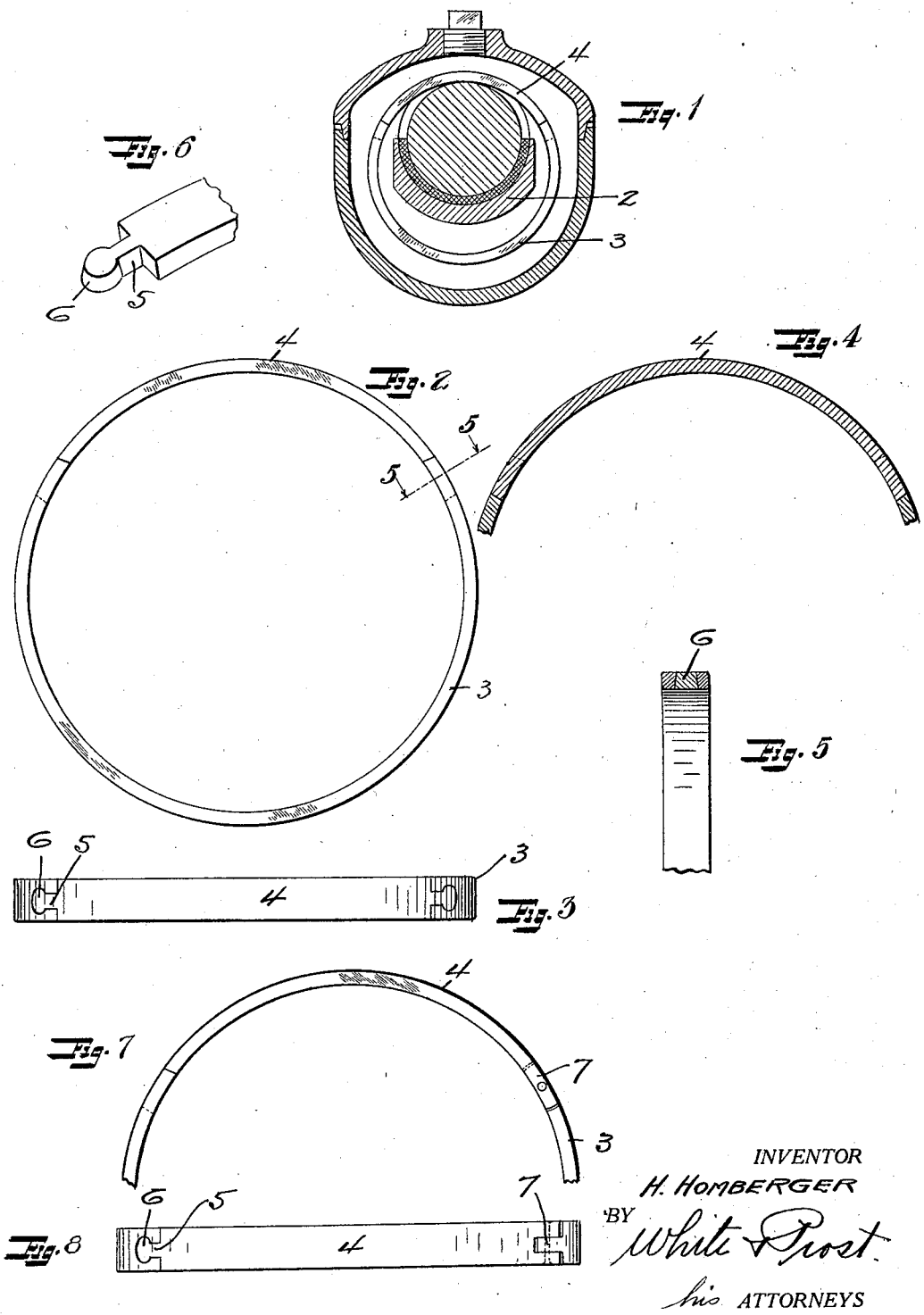

HEINRICH HOMBERGER, OF MILL VALLEY, CALIFORNIA.

OIL-RING.

1,386,931.	Specification of Letters Patent.	Patented Aug. 9, 1921.

Application filed August 26, 1918. Serial No. 251,356.

*To all whom it may concern:*

Be it known that I, HEINRICH HOMBERGER, a subject of Germany, and a resident of Mill Valley, Marin county, State of California, have invented a certain new and useful Oil-Ring, of which the following is a specification.

The invention relates to oil rings for use in ring oiling bearings.

An object of the invention is to provide an oil ring which may be placed on or removed from a shaft without disturbing the bearing, and which permits taking out the bearing without disturbing any fixtures mounted on the shaft.

Another object of the invention is to provide an oil ring which is perfectly circular in shape after it has been placed on the shaft.

The invention possesses other advantageous features, some of which, with the foregoing, will be set forth at length in the following description where I shall outline in full, that form of the invention which I have selected for illustration in the drawings accompanying and forming part of the present specification. In said drawings I have shown two forms of the oil ring of my invention, but it is to be understood that I do not limit myself to such forms, since the invention, as expressed in the claims, may be embodied in other forms.

Referring to said drawings:

Figure 1 is a cross section of a journal box showing the ring of my invention disposed on the shaft.

Fig. 2 is a side view of the ring of my invention.

Fig. 3 is a plan view of the ring shown in Fig. 2.

Fig. 4 is a section of a portion of the ring shown in Fig. 2.

Fig. 5 is a cross section of the ring taken on the line 5—5, Fig. 2.

Fig. 6 is a perspective view of an end of one of the ring segments.

Fig. 7 is a side view of a portion of a modified form of ring.

Fig. 8 is a plan view of the ring shown in Fig. 7.

To give satisfactory results, oil rings must fill a number of requirements, as follows: They must be perfectly circular without any flat spots, kinks or projections on their inner surface, so that they will rotate continuously; they must have no projections on the outer surface or side edges that might contact with rough spots in the bearing pocket and interrupt rotation of the ring; they must be of sufficient weight to produce satisfactory tractive effect on the shaft; they must be of sufficient width to deliver the proper amount of oil to the shaft; they must not be too large in diameter and they must be so constructed that while fulfilling the above conditions they may be readily placed on or removed from the shaft without disturbing any other element on the shaft. The rings most commonly furnished with power transmission bearings are made of a very light section of low grade spring steel with lapping or abutting ends. To place these rings on a shaft in the bearing, they are sprung open like a key ring and to accomplish this with a ring of reasonably small diameter, requires the bending of the ring beyond its elastic limit, with the result of an imperfect circle and a poor joint, after they have been bent back again into annular shape.

Parted rings, formed in two semi-circular parts, have been designed heretofore, with various types of joints, but they have been to a large extent unsatisfactory, owing to the disposition and character of the joints. With a ring divided into two semi-circular parts, it is extremely difficult to insert the parts into the journal box and join them together, on account of the presence of the lower bearing 2 which the ring must surround. In accordance with my invention I form a parted ring in two parts of unequal length, so that one part 3 is considerably longer than 180° and the other part 4 considerably shorter than 180°, the two parts when joined forming a perfect circle. The longer part ring 3 is inserted in the journal box around the shaft and on account of the length of this part, the ends thereof extend above the upper surface of the lower bearing 2, so that the shorter ring part 4 may be readily joined thereto. The two parts 3 and 4 are preferably joined together by snap joints, so that no tools are required for placing or removing them. The end of one ring part is provided with a projecting tooth or shank 5 having a head 6 on its end and the contiguous end of the other ring part is provided with a corresponding socket. The heads 6 are frusto-conoidal and seat radially. This produces a modified dove-tailed joint holding the parts rigidly together.

The projections 5—6 and the corresponding sockets are beveled, so that the projections come to their seats properly and provide flush surfaces on the inner and outer surfaces of the ring. The projections are preferably formed on the shorter ring segment 4, in which case the projections and sockets are tapered so that the projection enters the socket from the inside of the ring, thereby preventing any outward pressure on the parts from causing the joints to open. When the projections are formed on the longer ring segment, the projections and sockets are preferably tapered so that the projection enters the socket from the outside. This prevents the shorter segment from falling out of the ring. The longer segment 3 is preferably made so that when it is free, the ends thereof spring outward slightly from the line of the circle, requiring the ends to be pulled in slightly when the shorter segment is joined thereto. When in this position, the ring forms a true circle and due to the spring of the larger segment, places the joints under tension, holding them tight.

The ring may be formed of two segments of unequal length joined together at both ends with this dove-tailed joint, or one hinge joint 7 and one dove-tailed joint may be used, as shown in Figs. 7 and 8. The hinge pin is flush with the edges of the ring and the hinge joint is such that the shorter segment 4 may be rotated backwardly a sufficient distance to permit the passing of the free end of the long segment around the shaft and the lower bearing.

The segments may be fitted together to form the ring without twisting or moving the ends thereof to one side or out of a vertical plane common to both segments and in this way I avoid distorting the ring or the "springing" thereof permanently out of its true circular shape.

I claim:

1. An oil ring comprising two ring segments of unequal length connected by radially seating, mortise and tenon joints.

2. An oil ring comprising a segment having a length greater than 180° and a segment having a length less than 180° and radially seating joints connecting said segments together to form a circle.

3. An oil ring comprising two ring segments of unequal length joined together at one end and a radially seating snap joint joining the other ends of the segments.

4. An oil ring comprising segments the ends of the segments being provided with conical projections and conical sockets whereby the segments are joined together to form a ring.

5. An oil ring comprising two segments of unequal length connected by joints, the longer section being so formed that it springs out of the true circle of the ring when a joint is broken.

6. An oil ring comprising segments, radially arranged conical heads formed on segments, and correspondingly shaped sockets formed on the other ends of said segments, whereby the segments may be joined together to form the ring.

7. An oil ring comprising two segments, a shank on the end of one segment, a conical head on said shank, the contiguous end of the other segment being provided with a beveled socket to receive said head and shank.

In testimony whereof, I have hereunto set my hand at San Francisco, California, this 16th day of August, 1918.

HEINRICH HOMBERGER.